(12) United States Patent
Cichocki et al.

(10) Patent No.: US 7,052,640 B2
(45) Date of Patent: May 30, 2006

(54) MOLDABLE PELLET BASED ON THE COMBINSTION OF SYNTHETIC CELLULOSE FIBERS AND THERMOPLASTIC POLYMERS

(75) Inventors: Frank R. Cichocki, Easton, PA (US); James L. Thomason, Lanaken (BE); Terry L. Cheney, Northville, MI (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 10 days.

(21) Appl. No.: 10/847,758

(22) Filed: May 18, 2004

(65) Prior Publication Data

US 2004/0234806 A1  Nov. 25, 2004

Related U.S. Application Data

(62) Division of application No. 09/935,005, filed on Aug. 21, 2001, now Pat. No. 6,756,114.

(51) Int. Cl.
*B29B 13/00* (2006.01)

(52) U.S. Cl. .............................. 264/271.1; 264/279.1; 156/244.24

(58) Field of Classification Search ............... 428/378, 428/361, 375, 391, 392, 394; 156/244.2, 156/180, 244.24; 264/271.1, 279.1, 173.19, 264/173.16, 177.13, 177.16
See application file for complete search history.

(56) References Cited

U.S. PATENT DOCUMENTS

| | | | |
|---|---|---|---|
| 1,307,761 A | 6/1919 | Shelton | |
| 2,150,984 A | 3/1939 | Near et al. | |
| 2,719,336 A | 10/1955 | Stotler | |
| 2,808,884 A | 10/1957 | Shann et al. | |
| 2,974,554 A | 3/1961 | Schurmann et al. | |
| 3,050,427 A | 8/1962 | Slayter et al. | |
| 3,110,209 A | 11/1963 | Takehara | |
| 3,334,533 A | 8/1967 | Davis, Jr. | |
| 3,584,476 A | 6/1971 | Wynne et al. | |
| 3,584,664 A | 6/1971 | Helmberg et al. | |
| 3,644,109 A | 2/1972 | Klink et al. | |
| 3,744,361 A | 7/1973 | Van Doorn et al. | |
| 3,754,880 A | 8/1973 | Henderson et al. | |
| 3,763,561 A | 10/1973 | Scharfenberger | |
| 3,770,564 A * | 11/1973 | Koleske et al. ............. | 428/412 |
| 3,873,290 A | 3/1975 | Marzocchi | |
| 3,961,547 A | 6/1976 | Shainberg et al. | |
| 4,052,822 A | 10/1977 | Obear | |
| 4,059,235 A | 11/1977 | Bryant | |
| 4,071,339 A | 1/1978 | Griffiths | |
| 4,083,279 A | 4/1978 | Wester et al. | |
| 4,144,782 A | 3/1979 | Lindstrom | |
| 4,219,524 A | 8/1980 | Miller | |

(Continued)

FOREIGN PATENT DOCUMENTS

DE  199 49 591  4/2001

(Continued)

*Primary Examiner*—Merrick Dixon
(74) *Attorney, Agent, or Firm*—Ingar N. Eckert; Maria C. Gassaway

(57) ABSTRACT

A moldable pellet used for making high impact, non-abrasive recyclable structural composites consisting of a thermoplastic polymer or polymers, with or without fillers and additives, and a synthetic cellulosic fiber in yarn or tow form such as Rayon or Lyocell. The concentration of cellulose fiber within the pellet may vary from approximately 2–80 percent by weight or higher. This moldable pellet is suitable for molding in current molding applications such as, but not limited to, injection molding, extrusion compression molding, and compression molding.

20 Claims, 3 Drawing Sheets

U.S. PATENT DOCUMENTS

| | | | |
|---|---|---|---|
| 4,309,000 A | 1/1982 | Schefer et al. | |
| 4,351,459 A | 9/1982 | Huey-Miin | |
| 4,369,681 A | 1/1983 | Van Doorn et al. | |
| 4,534,254 A | 8/1985 | Budzich et al. | |
| 4,591,106 A | 5/1986 | Gay | |
| 4,658,684 A | 4/1987 | Brookhyser | |
| 4,682,523 A | 7/1987 | Johnson et al. | |
| 4,785,548 A | 11/1988 | Saleh | |
| RE33,111 E | 11/1989 | Niederer | |
| 5,048,387 A | 9/1991 | Niitsuma et al. | |
| 5,105,702 A | 4/1992 | Fara | |
| 5,107,735 A | 4/1992 | Ramun et al. | |
| 5,152,205 A | 10/1992 | Yoshida et al. | |
| 5,230,475 A | 7/1993 | Gerner | |
| 5,585,161 A * | 12/1996 | Difloe et al. | 428/109 |
| 5,678,774 A | 10/1997 | Bennett et al. | |
| 5,697,560 A | 12/1997 | Bennett | |
| 5,849,052 A * | 12/1998 | Barber, Jr. | 51/298 |
| 5,954,278 A | 9/1999 | Bennett et al. | |
| 5,970,837 A | 10/1999 | Arterburn et al. | |
| 5,972,503 A * | 10/1999 | Woodside | 428/378 |
| 6,076,442 A | 6/2000 | Arterburn et al. | |
| 6,099,773 A | 8/2000 | Reck et al. | |
| 6,114,464 A | 9/2000 | Reck et al. | |
| 6,138,544 A | 10/2000 | Newell | |
| 6,146,746 A | 11/2000 | Reck et al. | |
| 6,598,814 B1 | 7/2003 | Bascom et al. | |
| 2002/0104420 A1 | 8/2002 | Bascom et al. | |

FOREIGN PATENT DOCUMENTS

| | | |
|---|---|---|
| EP | 0 849 381 | 6/1998 |
| EP | 1018523 | 7/2000 |
| JP | 61-44971 | 5/1994 |
| JP | 61-70018 | 6/1994 |
| JP | 09 300281 | 11/1997 |
| WO | WO 99/02591 | 1/1999 |
| WO | WO 99/09100 | 2/1999 |

* cited by examiner

MOLDABLE PELLET BASED ON THE COMBINSTION OF SYNTHETIC CELLULOSE FIBERS AND THERMOPLASTIC POLYMERS

TECHNICAL FIELD AND INDUSTRIAL APPLICABILITY OF THE INVENTION

This application is a divisional of U.S. patent application Ser. No. 09/935,005, filed Aug. 21, 2001, now U.S. Pat. No. 6,756,114, which is hereby incorporated by reference in its entirely.

The present invention relates generally to structural composites and more specifically to moldable pellets consisting of a combination of thermoplastic polymers and synthetic cellulosic fibers that may be made into structural composites.

BACKGROUND OF THE INVENTION

Structural composites are well known and are used in a wide variety of applications that require plastic parts having a minimum threshold of mechanical properties such as strength and impact resistance while imparting cost savings in terms of manufacturing techniques and in terms of weight reduction. Examples of structural composites include sheet molding compound (SMC), fiber reinforced thermoplastics and structural reinforced injection molding (SRIM).

Introducing glass fiber or other reinforcing material into a thermoplastic or thermosetting polymer material typically makes structural composites. The glass fiber and polymer material may be mixed together and formed into a composite part in a wide variety of methods, including compression molding and injection molding. Structural composites made of glass fiber or other reinforcing material offer generally good mechanical properties in terms of impact, toughness, strength and may be used in a wide variety of applications.

One problem with glass reinforced or carbon fiber reinforced composites is that the reinforcement fibers are generally abrasive. This abrasiveness can adversely affect equipment used to mold the composite parts. This in turn increases the cost for manufacturing reinforced composites parts due to increased mold turnover and downtime associated with mold turnover.

Another problem with glass reinforced or carbon fiber reinforced composites is that the fiber tends to break during injection molding and extrusion compression molding processing. Thus, recycled parts made of reinforced composites lose significant mechanical properties associated with fiber length within the composite material during processing. Impact resistance is, in most cases, the most significantly affected mechanical property. However, strength and modulus may suffer as well.

Further, composite parts cannot be recycled without further degrading fibers within the composite material. Therefore, composite parts not made to exact specifications are disposed of as waste.

SUMMARY OF THE INVENTION

It is thus an object of the present invention to reduce abrasiveness in fiber reinforced structural composites without adversely affecting mechanical properties of the finished structural part.

It is another object of the present invention to process and recycle composite components without significantly reducing fiber length or compromising mechanical performance.

It is a further object of the present invention to reduce complexity in forming composite parts associated with traditional injection molding and compression molding techniques.

The above objects are accomplished by producing a moldable pellet consisting of a thermoplastic polymer or polymers, with or without fillers and additives, and a synthetic cellulosic fiber such as Rayon or Lyocell. The concentration of cellulose fiber within the pellet may vary from approximately 2–38 percent by weight or higher. This moldable pellet is suitable for molding in current molding applications such as, but not limited to, injection molding and extrusion compression molding.

It has been discovered that the impact performance of thermoplastics reinforced with synthetic cellulose fibers is excellent, typically superior to glass, carbon, natural fiber, or talc-reinforced thermoplastics and competitive with several impact resistant polymers such as ABS (acrylonitrile-butadiene-styrene), PC (polycarbonate)-ABS, Dylark, and other high impact polymers. In addition, synthetic fibers are non-abrasive and therefore will produce minimal wear on molding equipment. Also, because synthetic fibers are inherently tough, composite components may be processed and recycled without significantly reducing fiber length or compromising mechanical performance.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

Figure 1:
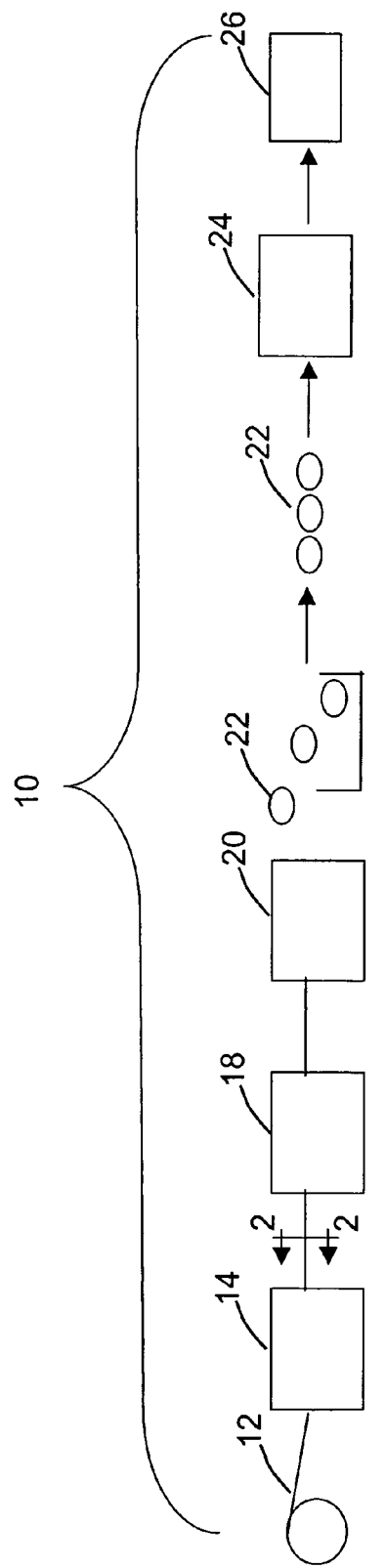
FIG. 1 describes a process for forming a moldable pellet according to a preferred embodiment of the present invention.

Referring now to FIG. 1, a schematic diagram for making a moldable pellet 22 is generally designated as 10.

The pellets 22 are produced by first passing a cellulosic yarn or tow 12 of between approximately 0.87 g/m–4.37 g/m (0.8–4.0 g/yard) through a cone-shaped dye 14, or wire coater, designed to evenly spread a thermoplastic polymer 16 circumferentially around the travelling fiber yarn or tow 12. For the purposes of clarity, yarn or tow describes the coupling of individual fibers that are well known to a person skilled in the art. For ease of description, however, yarn or tow are used interchangably within this application. Thus, where yarn alone is described, it is understood that a tow could also be used in place of the yarn. Further, where the phrase "yarn or tow" is used, it should be understood that either a fiber yarn or fiber tow may be used.

The encapsulated yarn 12 may then be passed through a water bath 18 immediately to solidify the polymer sheath or may be air-cooled. The encapsulated yarn 12 is then chopped or pelletized using commercially available choppers 20 and pelletizers (not shown) in varying lengths. The pellets 22 are chopped to lengths ranging from approximately 3 mm–600 mm (⅛ inch to 24 inches) or more in length, depending upon the application. Preferably, a Conair Jetro Pelletizer Model #2047 or an Owens Corning CB-83 chopper are used, with the latter being more preferable for mass production and quality control.

The chopped or pelletized composite fibers 22 are then fed into a molding machine 24 and molded into composite parts 26. Preferably, the molding machine 24 is an injection molding machine or an extrusion compression molding machine. However, other compression molding machines may also be used as are known in the art. The temperature within the molding machine 24 during the molding process is kept between approximately 170–240° C. (340–460° Fahrenheit) to ensure proper melting and flow of the thermoplastic polymer 16 without degrading the cellulosic fiber yarn 12. Preferably, the parts 26 are molded at temperatures less than 240° C. (460° F.) to avoid thermal degradation of the cellulose fibers in the yarn 12. The concentration of cellulose fiber yarn 12 within the pellet may vary from approximately 2–38 percent by weight or higher, with higher percentages resulting in higher impact resistance composite parts 26. A comparison of impact resistant properties of cellulosic fibers and other fibers is described below in FIG. 3.

Figure 2:
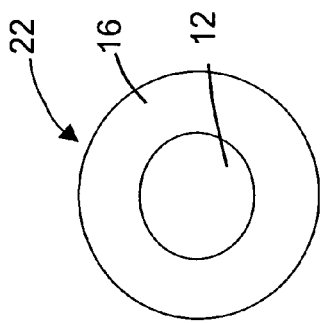
FIG. 2 is a section view of a moldable pellet made according to FIG. 1.

As best seen in FIG. 2, the moldable pellet 22 that is formed consists of the cellulosic fiber yarn 12 encapsulated within a thermoplastic polymer 16. The cellulosic fiber yarn 12 is preferably either Rayon or Lyocell and comprises between approximately 2 and 38 percent or more of the total weight of the moldable pellet 22 which makes up the composite part 26 when using an injection molding process or extrusion compression molding process. However, the cellulosic fiber yarn 12 preferably comprises approximately 50 to 80 weight percent when using other compression molding processes. Preferably, the thermoplastic polymer 16 comprises a high melt flow index polypropylene polymer homopolymer or copolymer. However, other thermoplastic polymers 16 may be used as long as the processing temperature remains below the temperature at which degradation of the cellulosic fiber yarn 12 occurs, which is around 230° C. (450° F.). Thus, certain nylons, polycarbonates, and acrylonitrile-butadiene-styrene ("ABS") polymers may be used as the thermoplastic polymer 16.

In addition, moldable pellets 22 may be dry-mixed with other polymers to enhance resin matrix properties. For example, the pellets 22 could be drymixed with low melt flow index polypropylenes and polyethylenes. In addition, pigmented resins may be added to the thermoplastic polymer 16 masterbatch to produce colored composite parts 26. Again, as above, the yarn 12 comprises approximately 2 to 38 percent by weight of the total weight of the composite part 26. This masterbatching operation provides an easy method to control fiber concentration, pigmentation, and properties of the molded composite part 26.

To aid in dispersing the yarn 12 fibers in the thermoplastic resin 16 when using an injection molding process or extrusion compression molding process, a size is preferably introduced to the cellulose yarn 12 fiber prior to the wire-coating step. The size is used to aid in dispersing the yarn 12 fibers within the matrix resin 16 during the melting/mixing step that occurs in the screw (extruder) section of a typical injection molding machine prior to injection into the molding chamber. This size may be an oil, lubricant, wax, polymeric, or non-polymeric material that is known in the art and applied in a wide variety of techniques, including by dipping, spraying or through the use of a pump. If,an oil size is used, good fiber dispersions are obtained in thermoplastic resins 16 with exceptionally high melt flow indices (on the order of 500) when a 10–20% mineral oil sizing is applied to the cellulosic fiber yarn 12.

Alternatively, a peroxide wax additive may be used in place of a size for injection molding purposes. The peroxide wax is used to reduce the viscosity of the thermoplastic polymer 16 to enable dispersion of the yarn 12 in the injection molding and extrusion compression molding process. Also, the peroxide wax may be incorporated into the wire coating process to reduce the viscosity of the wire coating resin. An example of a preferred formulation for a pellet 22 chopped to 6–13 mm (¼–½ inch) chop containing the peroxide wax includes rayon fiber (60% by weight), polypropylene having a melt flow index of 35 (37% by weight), a maleated polypropylene such as Polybond 3200 (2% by weight), and the peroxide wax (1% by weight). Additional polypropylene is dry mixed with the pellet to reduce the fiber concentration in the composite part 26 to approximately 33% by weight.

Of course, when a compression molding machine is used as the molding machine 24, this size is not needed, as there is no premixing necessary to form the composite part 26. In this process, pellets 22 of different chop lengths, from 6–13 mm (¼–24 inches) in length or more, are added directly to the compression molding equipment without a pre-melting/mixing step. The thermoplastic resin 16 in the pellet 22 melts during the compression molding process and impregnates the spaces surrounding the fiber 12 yarn, therein forming the composite part 26.

The effect of the sizing and temperature on notched and unnotched IZOD impact properties is described below in FIGS. 3, 4 and 5.

Figure 3:
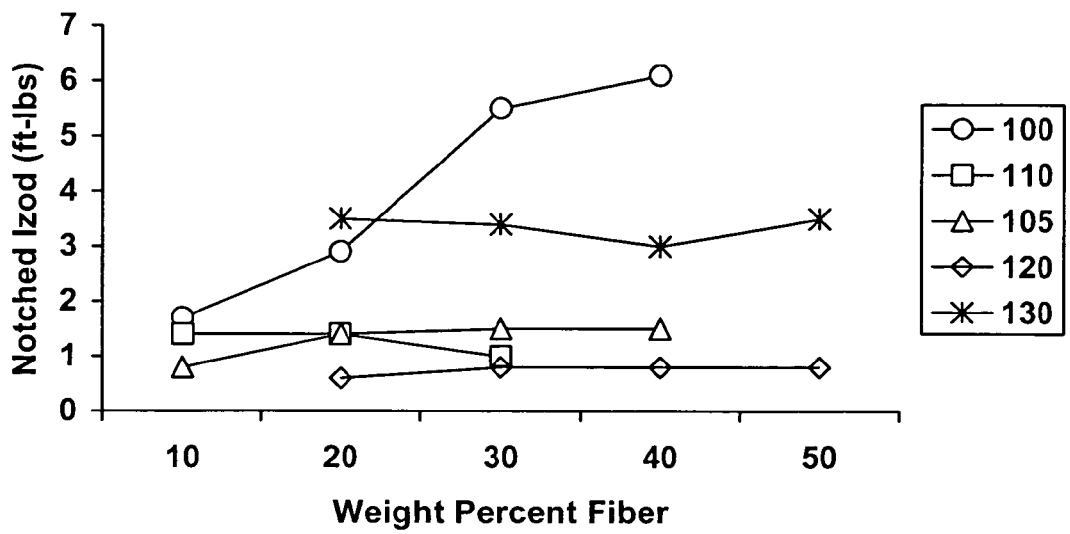
FIG. 3 is a graphical comparison of notched IZOD impact properties of various structural composites at varying fiber levels.

Referring now to FIG. 3, a comparison of notched IZOD properties for various reinforced polypropylene composite parts made in accordance with the preferred embodiment of FIG. 1 and the thermoplastic resin composition of FIG. 2 is illustrated. Here, rayon was used as the reinforcing cellulosic yarn 12 and the pellet 22 was chopped to approximately 13 mm (½ inch) in length. As seen in FIG. 3, composites reinforced with rayon according to a preferred embodiment of the present invention, as shown on line 100, displayed improved notched IZOD impact resistance, particularly above 25% weight percent fiber, as compared with other natural and glass reinforced composites. These other natural and glass reinforced composites include dry use chopped strands ("DUCS"), as seen on line 105, talc filled polypropylene, as seen on line 110, natural fiber composites, as seen on line 120, and glass bundle sheaths covered with polypropylene, such as Owens Corning Stamax, as seen on line 130.

Figure 4:
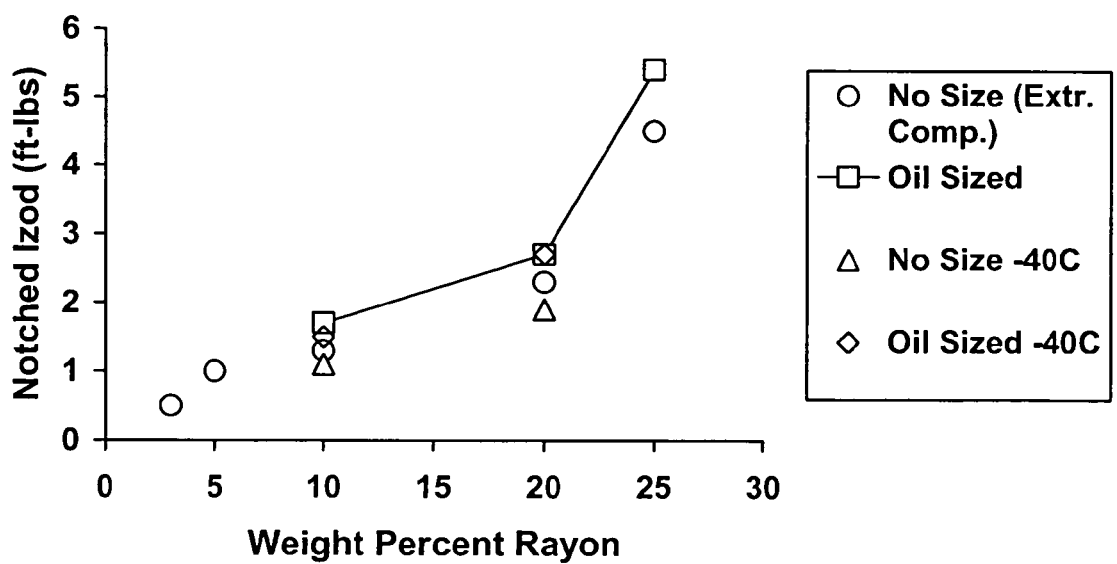
FIG. 4 is a graphical comparison the effect of oil sizing on the notched IZOD impact properties of a structural composite made with the moldable composite of the present invention.
Figure 5:
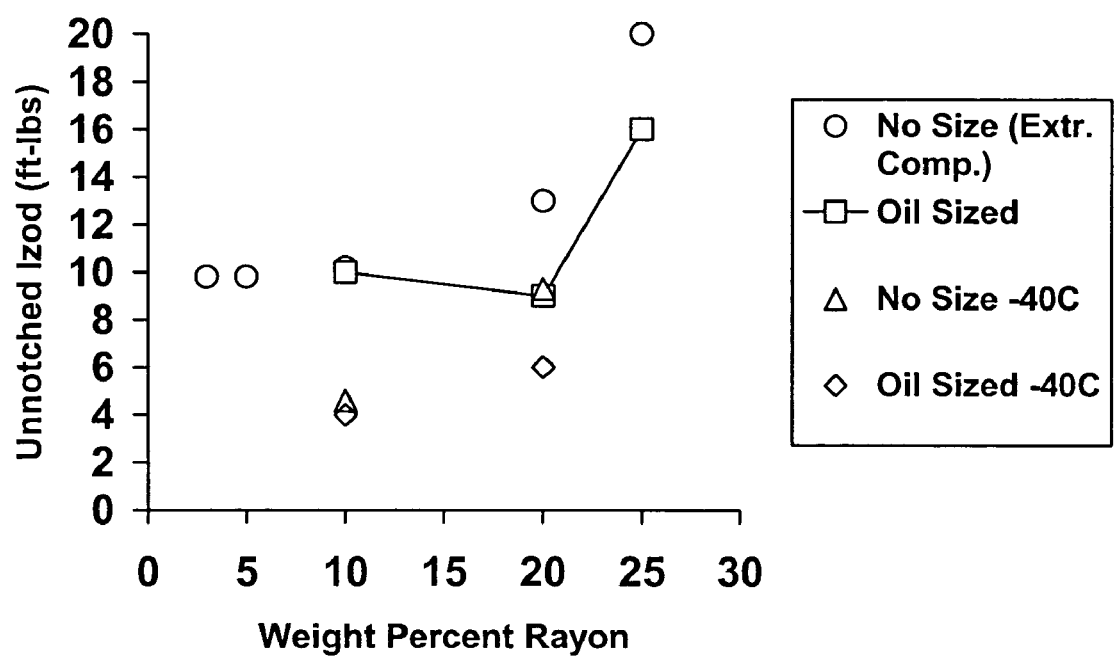
FIG. 5 is a graphical comparison the effect of oil sizing on the unnotched IZOD impact properties of a structural composite made with the moldable composite of the present invention.

Referring now to FIGS. 4 and 5, the effect of oil sizing on the notched and unnotched IZOD properties of Rayon-polypropylene extruded composites at room temperature and −40 degrees Celsius is illustrated. As seen in FIG. 4, the oil sizing improved the notched IZOD properties and a rayon-polypropylene composite at room temperature and −40 degrees Celsius with 10 and 20 percent rayon loading. For Unnotched IZOD properties, as seen in FIG. 5, the oil sizing appeared to have a slight detrimental effect, especially at higher loadings of twenty or twenty-five percent.

It has been discovered that the impact performance of thermoplastics reinforced with synthetic cellulose fibers is excellent, typically superior to glass, carbon, natural fiber, or talc-reinforced thermoplastics and competitive with several impact resistant polymers such as ABS (acrylonitrile-butadiene-styrene), PC(polycarbonate)-ABS, Dylark, and other high impact polymers.

In addition, synthetic fibers are non-abrasive and therefore will produce minimal wear on molding equipment. This in turn decrease costs in terms of mold turnover and downtime associated with mold turnover.

Also, because synthetic cellulosic fibers are inherently tough, composite components may be processed and recycled without significantly reducing fiber length or compromising mechanical performance.

Finally, the moldable pellet simplifies injection molding and compression molding techniques and improves part quality associated with these techniques by allowing a more uniform dispersion of fiber within the composite part.

While the invention has been described in terms of preferred embodiments, it will be understood, of course, that the invention is not limited thereto since modifications may be made by those skilled in the art, particularly in light of the foregoing teachings.

What is claimed is:

1. A method for making a high impact, low abrasive recyclable structural composite comprising the steps of:
providing a continuous cellulosic fiber yarn having a weight of from 0.8–4.0 grams/yard;
spreading a liquid thermoplastic polymer sheath circumferentially around said cellulosic fiber yarn;
solidifying said liquid thermoplastic polymer sheath to form a pellet precursor;
chopping or pelletizing said pellet precursor to form a plurality of moldable pellets; and
molding at least one of said moldable pellets to form the structural composite.

2. The method of claim 1, wherein said continuous cellulosic fiber yarn is selected from the group consisting of a continuous Rayon fiber yarn and a continuous Lyocell fiber yarn.

3. The method of claim 1, wherein the step of spreading a liquid thermoplastic polymer sheath circumferentially around said cellulosic fiber yarn comprises the step of passing said cellulosic fiber yarn through a cone-shaped die to apply a layer of thermoplastic polymer resin circumferentially around said cellulosic fiber yarn.

4. The method of claim 1, wherein the step of spreading a liquid thermoplastic polymer sheath circumferentially around said cellulosic fiber yarn comprises the step of spreading a liquid high melt flow index polypropylene polymer sheath circumferentially around said cellulosic fiber yarn.

5. The method of claim 1, wherein the weight of said cellulosic fiber yarn in said moldable pellets is between approximately 2 and 80 percent of the weight of said moldable pellets.

6. The method of claim 1, wherein the step of solidifying said liquid thermoplastic polymer sheath to form a pellet precursor comprises the step of cooling said liquid thermoplastic polymer sheath using a water bath.

7. The method of claim 1, wherein the step of molding at least one of said moldable pellets to form the structural composite comprises the step of molding at least one of said moldable pellets with a machine at a temperature between 170–240° C. to form the structural composite, wherein said machine is selected from the group consisting of an injection molding machine, a compression molding machine and an extrusion compression molding machine.

8. The method of claim 7 further comprising the step of introducing a sizing composition around said continuous cellulosic fiber yarn prior to the step of spreading a liquid thermoplastic polymer sheath circumferentially around said cellulosic fiber yarn.

9. The method of claim 7, further comprising the step of introducing a peroxide wax additive to said liquid thermoplastic polymer sheath prior to the step of spreading said liquid thermoplastic polymer sheath circumferentially around said cellulosic fiber yarn.

10. The method of claim 1, further comprising the step of dry mixing a polymer resin with said moldable pellets prior to the step of molding said moldable pellets to form the structural composite, wherein said polymer resin is selected from the group consisting of a low melt flow index polypropylene and a low melt flow polyethylene.

11. A method of forming a composite product comprising the steps of:
applying a size to an external surface of a cellulosic fiber yarn;
substantially encapsulating said sized cellulosic fiber yarn with a thermoplastic polymer to form pellet precursor;
pelletizing said pellet precursor to form moldable pellets; and
molding one or more of said moldable pellets to form a composite product.

12. The method of claim 11, further comprising the step of:
solidifying said thermoplastic polymer on said sized cellulosic fiber yarn after said encapsulating step.

13. The method of claim 11, wherein said size is selected from the group consisting of an oil sizing composition, a lubricant, a wax, a polymeric sizing composition and a non-polymeric sizing composition.

14. The method of claim 13, wherein said size is selected from the group consisting of mineral oil and peroxide wax.

15. The method of claim 11, further comprising the step of:
dry mixing a polymer resin with said moldable pellets prior to said molding step.

16. A method of forming a moldable pellet comprising the steps of:
substantially encapsulating a cellulosic fiber yarn with a thermoplastic polymer to form a pellet precursor; and
chopping said pellet precursor to form moldable pellets;
wherein the weight of said cellulosic fiber yarn in said moldable pellets are from approximately 2 and 80 percent of the weight of said moldable pellet.

17. The method of claim 16, further comprising the step of:
applying a size to an external surface of said cellulosic yarn prior to said encapsulating step, said size being selected from the group consisting of an oil sizing composition, a lubricant, a wax, a polymeric sizing composition and a non-polymeric sizing composition.

18. The method of claim 16, further comprising the step of:
solidifying said thermoplastic polymer on said cellulosic fiber yarn after said encapsulating step.

19. The method of claim 15, wherein said weight of said cellulosic fiber yarn in said moldable pellet is approximately 2–38 percent of the weight of the moldable pellet.

20. The method of claim 15, wherein said cellulosic fiber yarn is a member selected from the group consisting of a Rayon fiber yarn and a Lyocell fiber yarn.

* * * * *

UNITED STATES PATENT AND TRADEMARK OFFICE
CERTIFICATE OF CORRECTION

PATENT NO. : 7,052,640 B2
APPLICATION NO. : 10/847758
DATED : May 30, 2006
INVENTOR(S) : Cichocki Page 1 of 1

It is certified that error appears in the above-identified patent and that said Letters Patent is hereby corrected as shown below:

Title page, item [54] and col 1 Title, Line 2 - Should read "COMBINATION"

Signed and Sealed this

Eighth Day of August, 2006

JON W. DUDAS
*Director of the United States Patent and Trademark Office*